United States Patent Office 3,167,572
Patented Jan. 26, 1965

---

3,167,572
PROCESS FOR PREPARING β-HYDROCARBYLOXY ACID SULFATES
Donald L. Klass, Barrington, and John E. King, Evanston, Ill., assignors to The Pure Oil Company, Chicago, Ill., a corporation of Ohio
No Drawing. Filed June 14, 1961, Ser. No. 116,965
17 Claims. (Cl. 260—457)

This invention relates to new and useful improvements in processes for the production of β-hydrocarbyloxy acid sulfates.

Beta-hydrocarbyloxy acid sulfates are known in the prior art as intermediates in the preparation of detergents, and as compounds having surface-active properties, where the hydrocarbyl (hydrocarbyl refers to any radical containing only carbon and hydrogen) radical is of sufficient length. The most commonly used procedure for the preparation of these compounds consists of the reaction of alkoxy- or aryloxy-substituted alcohols (sold under the trademark "Cellosolves") with sulfur trioxide. This process suffers from at least two disadvantages. Firstly, the β-alkoxy group is likely to react partially with the sulfur trioxide, especially if the group is unsaturated, with the result that sulfonated acid sulfates are obtained. Secondly, the prior art method requires β-alkoxy- or aryloxy-substituted alcohols as starting reactants which are sometimes difficult and costly to prepare.

It is therefore one object of this invention to provide a new and improved process for the preparation of β-hydrocarbyloxy acid sulfates.

Another object of this invention is to provide an improved process for the preparation of β-hydrocarbyloxy acid sulfates from alcohols, glycols, and phenols.

A feature of this invention is the provision of a process in which ethylene sulfate, or alkyl or aryl derivatives thereof, is reacted with a compound selected from the group consisting of alcohols, glycols, and phenols in solution in an inert solvent. A basic catalyst may be required in some cases.

Another feature of this invention is the provision of a process in which an epoxide is reacted with a sulfur trioxide complex, and the reaction product which is obtained is then reacted with an alcohol, glycol, or phenol in solution in an inert solvent.

Other objects and features of this invention will become apparent from time to time throughout the specification and claims as hereinafter related.

This invention consists of our new and improved method for preparing β-hydrocarbyloxy acid sulfates from alcohols, glycols, and phenols. In our process, ethylene sulfate, or an alkyl or aryl derivative thereof, is dissolved in an inert solvent (the solvent may be omitted when the reactants are miscible) and reacted with at least one equivalent of an alcohol, glycol, or phenol. The reaction is carried out preferably at a temperature of about the reflux temperature of the solvent, although temperatures in the range from about —20° to +200° C., can be used. The time of reaction, of course, varies with the reaction temperature. Under the conditions of reaction, a precipitate forms which is a β-hydrocarbyloxy acid sulfate produced by reaction of the alcohol, glycol, or phenol with the ethylene sulfate or derivative thereof. If desired, the reaction can be carried out in the presence of a base (alkali metal hydroxide or nitrogen base) to produce the corresponding salt of the acid sulfate product. Alternatively, the acid salt may be recovered and subsequently reacted with a base to produce the salt.

In our process, we can also use an epoxide, such as ethylene oxide, propylene oxide, styrene oxide, or cyclohexene oxide, as a starting reagent. The epoxide is treated with a sulfur trioxide complex, e.g., sulfur trioxide-dioxane, to produce a reaction mixture containing ethylene sulfate, or a derivative thereof, and a reaction product containing the epoxide, sulfur trioxide, and the complexing agent in chemical combination. The reaction mixture which is thus formed is then treated with an alcohol, phenol, or glycol to produce the desired β-hydrocarbyloxy acid sulfate. This embodiment can also be carried out in the presence of a base to produce the metal salt of the product in a one-step reaction.

In carrying out the process of this invention, it is preferred that an inert solvent be used in which the ethylene sulfate (or derivative thereof) and the alcohol, glycol, or phenol are soluble, but in which the product is insoluble. The inert solvent is defined as one which is unreactive toward either the reactants or the reaction products under the condition of reaction. Inert solvents which can be used in this process are characterized by low hydrogen-bonding ability and a solubility parameter in the range from about 9.3 to 10.6. The solubility parameter is a term developed by Hildebrand and discussed in detail, in Hildebrand and Scott, Solubility of Nonelectrolytes, 3rd edition, Reinhold Publishing Corp. (1949). The use of the solubility parameter in prediction of solubility characteristics of various solvents is developed by Burrell in Solubility Parameters for Film Formers, Official Digest, 27, 727–758 (1955). Solvents which fall within the above definition with regard to solubility parameter and hydrogen-bonding ability, and which are inert in the reaction, include the following: chloroform, pentachloroethane, chlorobenzene, tetrahydronaphthalene, 1,1,2-trichloroethane, dichloroethyl ether, ethylene dichloride, o-dichlorobenzene, nitrobenzene, 1,2-dibromoethane, and β-bromonaphthalene. Additionally, mixtures of solvents can be used which have low hydrogen-bonding ability and a solubility parameter in the aforementioned range, even though the individual solvents in the mixture are not solvents for the reactants in this process. For example, neither carbon tetrachloride nor methylene iodide is a solvent which can be used in this reaction, but a mixture of equal parts by volume of these solvents can be used in this process. Similarly, a mixture of dibromoethane and chloroform is superior as a solvent to either of these solvents alone when used in this process.

We have found that our process functions satisfactorily at temperatures in the range of about —20° to +200° C., although temperatures close to the reflux temperature of the solvent are preferred. Within this temperature range, we have found that when ethylene sulfate, or alkyl or aryl derivatives thereof (or the reaction product obtained by reaction of an epoxide with a sulfur trioxide complex), and an alcohol, phenol, or glycol are reacted, preferably in solution in an inert mutual solvent, the reaction goes to completion with a short time to yield a precipitate containing a β-hydrocarbyloxy acid sulfate. If the reaction is carried out in the presence of an alkali metal or alkaline earth metal hydroxide, carbonate, or other base, a salt of the acid sulfate is obtained directly. The precipitate is recovered by simple filtration and can be further purified by recrystallization from a suitable solvent. In carrying out this process, we have found that the ratio of reactants is not critical, although we prefer to use at least stoichiometric proportions so that we avoid the problem of separating the product from unreacted material.

The following non-limiting examples are illustrative of the scope of this invention.

*Example I*

Ethylene sulfate (0.37 mol), prepared in situ from 29.6 g. of sulfur trioxide and 16.3 g. of ethylene oxide, in 240 ml. of 1,2-dichloroethane was mixed with 34.8 g. (0.37 mol) of phenol and 51.1 g. (0.37 mol) of potassium carbonate and refluxed for 12 hours. During this time of reaction a white precipitate formed and was recovered by filtration. The precipitate was a white, waxy solid and was partially purified by washing with ether. The washed material had a melting point of 201°–205° C., and weighed 57.5 g. This product appeared to be a mixture of organic product and inorganic by-product salts.

The crude product was recrystallized from Formula 30 alcohol (denatured ethanol, U.S. denaturant Formula 30) and the by-product inorganic salts were filtered from the solution, thus yielding a somewhat purer product, 2-phenoxyethane-1-acid sulfate potassium salt. The composition of the product was confirmed by elemental analysis and by infrared analysis, indicating the presence of an aromatic ring and an acid sulfate grouping. The product was subjected to acid hydrolysis to yield 2-phenoxy-ethanol, thus confirming the structure of the product. The product obtained in this example, 2-phenoxy-ethane-1-acid sulfate, is useful as an intermediate in the preparation of surface-active agents and detergents, and has detergent properties itself, as well as being an intermediate in the preparation of 2-phenoxy ethanol.

*Example II*

In another experiment, a solution of dioxane-sulfur-trioxide complex was prepared by treating a solution of 210 ml. of dioxane in 300 ml. of 1,2-dichloroethane with one mol of sulfur trioxide. Then ethylene oxide was bubbled into the suspension of complex at a rate of 155 ml./min. for 2.5 hours, with stirring. After about 1 hour of addition of ethylene oxide, the complex had dissolved, indicating that the sulfur trioxide had reacted with the ethylene oxide to form ethylene sulfate.

One-half of the reaction mixture, containing 0.5 mol of ethylene sulfate, was treated with 0.5 mol of n-butyl alcohol. The mixture was refluxed at 88°–90° C., with stirring, for 2 hours. At the end of this time, unreacted materials and solvent were removed by vacuum distillation, which left a brown oil as the reaction product. The reaction product which was thus obtained was identified as 2-n-butoxy-ethane-1-acid sulfate by means of infrared analysis. Confirmation of the identification of the product was obtained by hydrolysis of the product with aqueous acid, followed by ether extraction, and distillation of the extracts to obtain n-butoxy ethanol (identified by boiling point and infrared analysis).

*Example III*

A solution of 1.0 mol of butylene sulfate and 400 ml. of chloroform is refluxed for 5 hours with 1.0 mol of ethanol. After completion of reaction, the solvent and unreacted materials are removed by vacuum distillation, leaving as a product 2-ethoxy-butane acid sulfate.

*Example IV*

A solution of 1.0 mol of propylene sulfate and 300 ml. of 1,2-dibromoethane is refluxed for 10 hours with 1.0 mol of ethylene glycol and 1.0 mol of sodium carbonate. A solid precipitate is formed which is washed, filtered, and recrystallized from alcohol to yield the sodium salt of 2-hydroxyethoxy-propane-acid sulfate.

*Example V*

A solution of 1.0 mol of ethylene sulfate in dichloroethyl ether is refluxed for 2.0 hours with 1.0 mol of octadecenol (oleoyl alcohol). After completion of reaction, the solvent and unreacted materials are removed by vacuum distillation and the product recovered is 2-octadecenoxy-ethane-1-acid sulfate.

*Example VI*

A solution of 1.0 mol of styrene sulfate in 1,1,2-trichloroethane is mixed with 1.0 mol of allyl alcohol and stirred for 10 hours at 25° C. At the end of this time, unreacted material and solvent is removed by vacuum distillation leaving a crude product consisting essentially of 2-allyloxy-2-phenyl-1-acid sulfate. This product can be polymerized to produce a resinous material suitable for use as an ion-exchange resin.

*Example VII*

A solution of one mol of dioxane in 300 ml. of 1,2-dichloroethane is treated with one mol of sulfur trioxide to prepare a slurry of dioxane-sulfur-trioxide complex. The complex is then mixed with cyclohexene oxide and stirred for about 2 hours to prepare cyclohexene sulfate. Next, the cyclohexene sulfate is treated with one mol of cyclohexanol and refluxed, with stirring, for 3 hours. At the end of this reaction period, the unreacted materials and solvent are removed by vacuum distillation, leaving a product consisting essentially of cyclohexyloxy cyclohexyl acid sulfate.

*Example VIII*

A solution of one mol of dioxane in 300 ml. of 1,2-dichloroethane is treated with one mol of sulfur trioxide to prepare the dioxane-sulfur-trioxide complex. Then ethylene oxide is bubbled into the suspension of dioxane-sulfur-trioxide complex at a rate of 155 ml./min. for 2½ hours, with stirring. After about one hour of addition of ethylene oxide, the complex dissolves, indicating that the sulfur trioxide has reacted with the ethylene oxide to form ethylene sulfate. Next, a solution of ethylene sulfate is treated with one mol of ethyl Cellosolve (ethoxy ethanol) and refluxed with stirring for 10 hours. At the end of this period of reaction, the unreacted materials and solvent are removed by vacuum distillation, leaving a product consisting essentially of 2-ethoxy ethoxy ethane acid sulfate.

From the foregoing examples, it is seen that our process is generally applicable to the reaction of ethylene sulfate, or derivatives thereof containing alkyl or aryl substituents (or reaction products of hydrocarbon epoxides with a sulfur-trioxide-dioxane complex), with alcohols, phenols and glycols. While several examples have been given of each of the principal reactants, this process is not in any way limited to those examples. The process is operative with cyclic sulfates in general, including but not limited to ethylene sulfate, propylene sulfate, butylene sulfate, hexylene sulfate, decene sulfate, octadecene sulfate, butadiene disulfate, styrene sulfate, cyclohexene sulfate, etc., and reaction products obtained by reaction of $C_2$–$C_{60}$ hydrocarbon epoxides with a sulfur trioxide complex such as sulfur-trioxide-dioxane. Similarly, the reaction is operative with alcohols, glycols and phenols, including, but not limited to, ethanol, propynol, isopropynol, butanol, hexanol, octanol, decanol, octadecanol, phenol, naphthol, resorcinol, cyclohexanol, cyclopentanol, benzyl alcohol, 2-phenyl ethanol, styryl alcohol, allyl alcohol, ethoxy ethanol, butoxy ethanol, phenoxy ethanol, and other similar polyether alcohols, i.e., polyethers containing only one hydroxyl group. The reaction is generally carried out in solution due to the fact that the cyclic sulfates which are used as reactants are prepared in solution. The solvents which can be used are inert solvents, preferably ones having a low hydrogen-bonding ability and a solubility parameter in the range from about 9.3 to 10.6. Where the reaction is carried out between ethylene sulfate or other cyclic sulfates which are liquid and miscible to some extent with the alcohol reactant, the solvent can be eliminated and the reactants mixed together and stirred and warmed sufficiently to effect reaction. Reaction is generally carried out using stoichiometric proportions to avoid the problem of separation of the product from unreacted material. The process is generally carried out at the reflux temperature of the solvent or of one of the reactants, although lower temperatures can be used if sufficient reaction time is allowed. In general, the reaction can be carried out at temperatures in the range from about −20° to +200° C. The acid ester which is obtained in this process can be used as obtained from the reaction mixture as a surface-active agent, or can be further reacted to prepare derivatives having detergent and surface-active properties. The acid esters which are obtained in accordance with this invention can be reacted with alkalis, such as alkali metal and alkaline earth metal hydroxides, oxides, and carbonates, and with nitrogen bases such as ammonia, amines, urea, guanidine, etc. The basic materials which are used for forming salts of the product acid esters can be added to the reaction mixture to form the salts in a one-step process, with the exception of ammonia, amines, etc., which are reactive with the ethylene sulfate. When ammonium or amine salts are desired, these materials must be reacted with the product acid ester inasmuch as they cannot be included in the initial reaction mixture.

While we have described our invention fully and completely with special emphasis upon several preferred embodiments thereof, we wish it to be understood that within the scope of the appended claims this invention may be practiced otherwise than as specifically described herein.

The embodiments of the invention in which an exclusive property or privilege is claimed are as follows:

1. A method of producing β-hydrocarbyloxy acid sulfates which comprises reacting at a temperature of about −20° to +200° C. a compound selected from the group consisting of ethylene sulfate and alkyl, cycloalkyl and mono-nuclear aryl derivatives thereof, with a compound selected from the group consisting of alcohols, glycols, and phenols.

2. A method in accordance with claim 1 in which the reaction is carried out in solution in a solvent which is inert under the reaction conditions.

3. A method in accordance with claim 2 in which the solvent is one of low hydrogen-bonding power and has a solubility parameter of about 9.3 to 10.5.

4. A method in accordance with claim 3 in which the solvent is selected from the group consisting of chloroform, pentachloroethane, chlorobenzene, tetrahydronaphthalene, 1,1,2-trichloroethane, dichloroethyl ether, 1,2-dichloroethane, o-dichlorobenzene, nitrobenzene, 1,2-dibromoethane, and β-bromonaphthalene.

5. A method in accordance with claim 1 in which the reactants are mixed and reacted in substantially stoichiometric proportions.

6. A method in accordance with claim 1 in which the sulfate reactant is ethylene sulfate.

7. A method in accordance with claim 1 in which the sulfate reactant is butylene sulfate.

8. A method in accordance with claim 1 in which the sulfate reactant is cyclohexene sulfate.

9. A method in accordance with claim 1 in which the sulfate reactant is styrene sulfate.

10. A method in accordance with claim 1 in which the second-named reactant is ethanol.

11. A method in accordance with claim 1 in which the second-named reactant is n-butanol.

12. A method in accordance with claim 1 in which the second-named reactant is octadecenol.

13. A method in accordance with claim 1 in which the second-named reactant is allyl alcohol.

14. A method in accordance with claim 1 in which the second-named reactant is cyclohexanol.

15. A method in accordance with claim 1 in which the second-named reactant is phenol.

16. A method in accordance with claim 1 in which the second-named reactant is ethylene glycol.

17. A method in accordance with claim 1 in which the second-named reactant is ethoxyethanol.

References Cited in the file of this patent

UNITED STATES PATENTS

| | | |
|---|---|---|
| 1,897,741 | Ulrich et al. | Feb. 14, 1933 |
| 2,852,548 | Gundel | Sept. 16, 1958 |

FOREIGN PATENTS

| | | |
|---|---|---|
| 208,790 | Germany | Mar. 29, 1908 |